US006693524B1

(12) United States Patent
Payne

(10) Patent No.: US 6,693,524 B1
(45) Date of Patent: Feb. 17, 2004

(54) VEHICLE BACKUP MONITORING AND ALARM SYSTEM

(76) Inventor: George R. Payne, 1429 Keisa La., Irving, TX (US) 75060

( * ) Notice: Subject to any disclaimer, the term of this patent is extended or adjusted under 35 U.S.C. 154(b) by 0 days.

(21) Appl. No.: 09/089,153

(22) Filed: Jun. 2, 1998

(51) Int. Cl.[7] .................................................. B60Q 1/22
(52) U.S. Cl. ...................... 340/463; 340/431; 340/435; 340/436; 340/903; 340/937; 348/148
(58) Field of Search .................................. 340/463, 436, 340/435, 460, 937, 932.2, 903, 431 A; 307/10.1, 10.7, 10.8; 364/108, 909; 348/148, 149, 118

(56) References Cited

U.S. PATENT DOCUMENTS

| 3,226,673 A |   | 12/1965 | Cudworth ...................... 340/31 |
| 3,689,695 A |   | 9/1972 | Rosenfield et al. ......... 178/7.81 |
| 3,760,414 A | * | 9/1973 | Nicolson ...................... 340/435 |
| 4,214,266 A |   | 7/1980 | Myers ........................... 358/108 |
| 4,240,152 A |   | 12/1980 | Duncan et al. .............. 367/108 |
| 4,277,804 A |   | 7/1981 | Robison ....................... 358/108 |
| 4,910,591 A |   | 3/1990 | Petrossian et al. .......... 358/103 |
| 4,937,796 A |   | 6/1990 | Tendler ........................ 367/116 |
| 4,943,796 A |   | 7/1990 | Lee ............................... 340/435 |
| 4,974,215 A |   | 11/1990 | Bolz et al. .................... 367/108 |
| 5,289,321 A |   | 2/1994 | Secor ............................ 359/896 |
| 5,303,205 A |   | 4/1994 | Gauthier et al. ............. 367/108 |
| 5,306,953 A |   | 4/1994 | Weiner ......................... 307/10.1 |
| 5,373,482 A | * | 12/1994 | Gauthier ....................... 367/99 |
| 5,530,421 A |   | 6/1996 | Marshall et al. ............. 340/436 |
| 5,574,426 A | * | 11/1996 | Shisgal et al. ............... 340/435 |
| 5,598,164 A | * | 1/1997 | Reppas et al. ................. 342/70 |
| 5,646,614 A |   | 7/1997 | Abersfelder et al. ...... 340/932.2 |
| 5,670,935 A | * | 9/1997 | Schofield et al. ............ 340/461 |
| 5,680,123 A |   | 10/1997 | Lee .............................. 340/937 |
| 5,734,336 A | * | 3/1998 | Smithline .................... 340/903 |
| 5,760,828 A | * | 6/1998 | Cortes .......................... 348/143 |

\* cited by examiner

*Primary Examiner*—Davetta W. Goins
(74) *Attorney, Agent, or Firm*—John D. Gugliotta

(57) ABSTRACT

A vehicle backup monitoring and alarm system which comprises a system of three closed circuit video cameras, three laser-based distance detection systems and an associated monitor is disclosed. A camera and a laser-based distance detection system are mounted on each side, as well as the rear of the motor vehicle or large truck, and coupled to one monitor, located by the driver, which displays all three images simultaneously. The distance to the closest object, displayed by each camera, as determined by the laser-based distance detection system, is superimposed over the respective object in the monitor. If any of these said distances fall below a minimum predetermined distance, the numeric representation will flash and an audible alarm will sound.

8 Claims, 4 Drawing Sheets

VEHICLE BACKUP MONITORING AND ALARM SYSTEM

BACKGROUND OF THE INVENTION

1. Field of the Invention

The present invention relates generally to driving aids and more particularly, to a vehicle backup monitoring and alarm system.

2. Description of the Related Art

Commercial drivers of large commercial truck and/or tractor trailer rigs are continually faced with the task of backing their vehicles into loading docks, parking spaces and other tight positions, as well as merging on roads or interstates. These tasks become even more daunting for the occasional driver or the amateur renter who has limited or no experience in such matters. The usual solution of using side mounted mirrors provides for a limited field of view, with associated blind spots and loss of depth of vision. Using such mirrors coupled with bad judgement risks damage to people, property, and other vehicles.

One solution to such disadvantages of side mounted mirrors involve the use of video cameras and associated cab mounted monitors. The previous art consists of many examples of inventions using such cameras and monitors. Examples of such prior art include the following:

| U.S. Pat. No. | Inventor | Issue Date |
| --- | --- | --- |
| 5,680,123 | Lee | Oct. 21, 1997 |
| 5,646,614 | Abersfelder et al. | Jul. 8, 1997 |
| 5,530,421 | Marshall et al. | Jun. 25, 1996 |
| 5,289,321 | Secor | Feb. 22, 1994 |
| 4,910,591 | Petrossian et al. | Mar. 20, 1990 |
| 4,277,804 | Robison | Jul. 7, 1981 |
| 3,689,695 | Rosenfield et al. | Sept. 5, 1972 |

Devices constructed in accordance with these disclosures allow for the remote visualization of volume and objects located to the rear and/or sides of a motor vehicle or large truck. However, under many circumstances there is a lack of depth perception when viewing a video screen. Clearly, a means by which the actual distance from the object to the motor vehicle or truck could be viewed would be advantageous.

The prior art contains many examples of inventions which allow for the visual and/or audible annunciation of distances between objects and the motor vehicle under one's control. Examples of such prior art include the following:

| U.S. Pat. No. | Inventor | Issue Date |
| --- | --- | --- |
| 4,943,796 | Lee | Jul. 24, 1990 |
| 4,937,796 | Tendler | Jun. 26, 1990 |
| 4,240,152 | Duncan et al. | Dec. 16, 1980 |
| 3,226,673 | Cudworth | Dec. 28, 1965 |

Devices constructed in accordance with these disclosures allow for the visual indication of distance to objects, but without a graphic representation of the surroundings, it is not clear to the driver what object is how close. Clearly a method that combines the actual distance to a graphic visualization would be the ideal method for insuring safety when driving and during parking or docking maneuvers.

In U.S. Pat. No. 5,306,953, issued in the name of Weiner, a system for adjusting the side mounted mirrors on a large tractor trailer rig is disclosed. This invention automatically turns the mirrors in relation to the location of the trailer portion. While this invention helps to reduce the blind spots, it does not allow for increased depth perception or for distance interpretation nor does it allow for vision on the rear of the vehicle and is thus an unsuitable solution to the aforementioned problems.

In U.S. Pat. No. 5,303,205, issued in the name of Gauthier et al, a system by which distances to objects are displayed in small digital readouts on the side mounted mirrors themselves is disclosed. This device, while aiding in depth perception, does nothing to eliminate blind spots and the problems associated with them.

In U.S. Pat. No. 4,974,215, issued in the name of Bolz et al., a system by which distances to a loading dock is indicated on a digital display attached to the loading dock is disclosed. However, this system functions only on loading docks equipped with such a device and is thus unsuitable for continuous monitoring of all areas behind and to the side of motor vehicles or large trucks.

Finally, in U.S. Pat. No. 4,214,266, issued in the name of Myers, a system which utilizes a closed circuit video system having distance measurement capabilities is disclosed. While this disclosure represents an apparatus closest in design to the present invention, it requires visual targets on the object being maneuvered to. This is clearly not acceptable in all situations where target objects are not present. It also does nothing to eliminate blind spots on the side of the motor vehicle or large truck, which will pose problems when merging lanes on a road or highway.

Consequently, a need has been felt for providing a device and method which overcomes the problems cited above.

SUMMARY OF THE INVENTION

It is therefore an object of the present invention to provide an improved vehicle backup monitoring and alarm system.

It is therefore another object of the present invention to provide an improved vehicle backup monitoring and alarm system that allows for the driver of a said equipped vehicle to be able to see all areas to the side or rear of the vehicle with no blind spots.

It is therefore yet another object of the present invention to provide an improved vehicle backup monitoring and alarm system that permits the driver to have a numeric indication of distance to the closest object to the rear and to both sides which is superimposed on the visual image.

It is therefore another object of the present invention to provide an improved vehicle backup monitoring and alarm system that allows that sounds an alarm should the distance to the sides or rear of the vehicle to an object fall within a minimum predetermined distance.

It is therefore yet another object of the present invention to provide an improved vehicle backup monitoring and alarm system that allows the present invention to be easily installed in a permanent or temporary manner on any motor vehicle or large truck.

Briefly described according to the preferred embodiment of the present invention, an improved vehicle backup monitoring and alarm system which comprises a system of three closed circuit video cameras, three laser-based distance detection systems and an associated monitor is disclosed. A camera and a laser-based distance detection system are mounted on each side, as well as the rear of the motor vehicle or large truck, and coupled to one monitor, located by the driver, which displays all three images simultaneously. The distance to the closest object, displayed by each camera, as determined by the laser-based distance detection system, is superimposed over the respective object in the monitor. If any of these said distances fall below a minimum predetermined distance, the numeric representation will flash and an audible alarm will sound.

It is a feature of the present invention to reduce the reliance on side mounted mirrors, and thus eliminate the risks associated with blind spots and lack of depth perception common when using said mirrors.

It is another feature of the present invention to provide a device that can be easily produced using existing technology, materials and assembly techniques.

Another advantage of the present invention is that it is simple, and therefore, inexpensive to manufacture. This savings, if passed on to the consumer, may influence the public to utilize such a device. A simple design also increases product reliability and useful product lifetime.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

In order to describe the complete relationship of the invention, it is essential that some description be given to the manner and practice of functional utility and description of a vehicle backup monitoring and alarm system.

The best mode for carrying out the invention is presented in terms of its preferred embodiment, herein depicted within the Figures.

1. Detailed Description of the Figures

Figure 1:
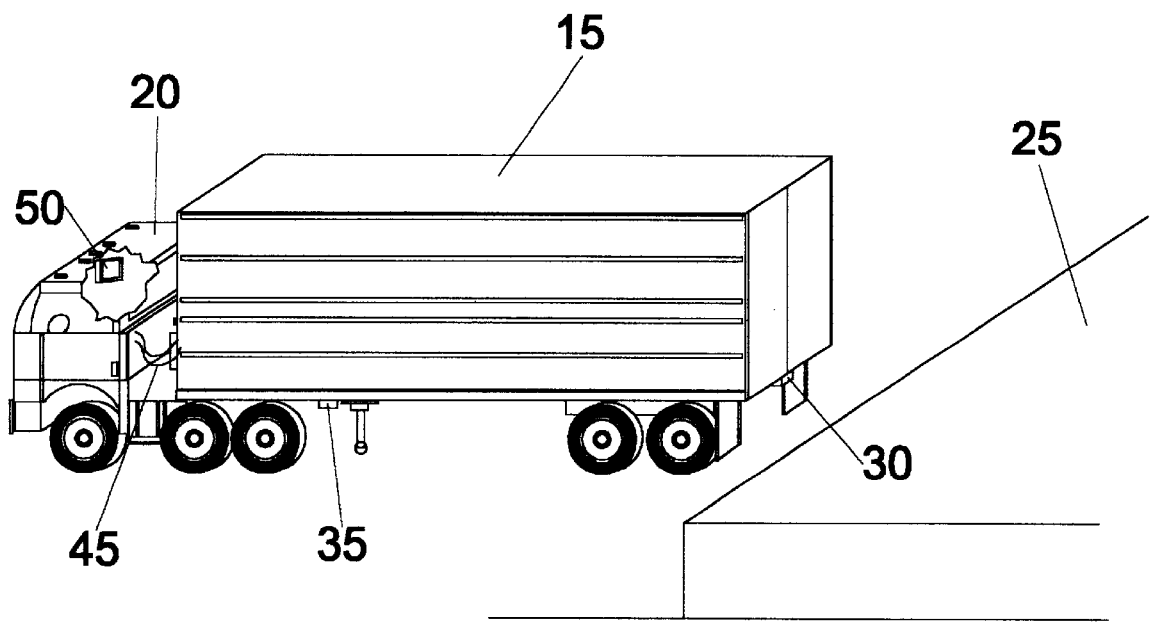
FIG. 1 is a perspective view of a vehicle backup monitoring and alarm system according to a preferred embodiment of the present invention.

Referring now to FIG. 1, a perspective view of a vehicle backup monitoring and alarm system 10 according to a preferred embodiment of the present invention is disclosed. A trailer 15 with its associated tractor 20 is shown approaching a loading dock 25 in a rearward or backing up fashion. Located on the rear of the trailer 15 near the bottom, is a rear detection module 30. The rear detection module 30 contains a small video camera, a laser-based distance detection system and a pair of high intensity lamps for increased rearward illumination over that normally provided by the reverse light provided on the trailer 15. The internal components of the rear detection module 30 will be described in greater detail hereinbelow. A driver's side detection module 35 is mounted on the trailer 15 approximately one-third of the way back from the front near the bottom on the driver's side as shown. A passenger side detection module 40 (not shown in this FIG.) is mounted in a symmetrical manner on the passenger side of the trailer 15. A series of interconnecting cables 45 is then routed from the rear detection module 30, the driver's side detection module 35, and the passenger side detection module 40, under the trailer 15 and up to the tractor 20. (Only the portion of the interconnecting cables 45 running between the trailer 15 and the tractor 20 is shown for purposes of clarity). Inside of the tractor 20, the interconnecting cables 45 connect to additional components that will be described later and to a display monitor 50 as shown through a cutaway view of the tractor 20. The display monitor 50 is located near the head liner of the tractor 20 in a position easily viewable by the driver. It is envisioned that the display monitor 50 would be of a flat panel display, similar to that found on laptop computers that is mounted on a hinge and spring system, that is capable of being folded up and away when not in use. It is also envisioned that both the driver's side detection module 35 and the passenger side detection module 40 could benefit from a pair of high intensity lamps for increased illumination, as with the rear detection module 30 described above.

Figure 2:
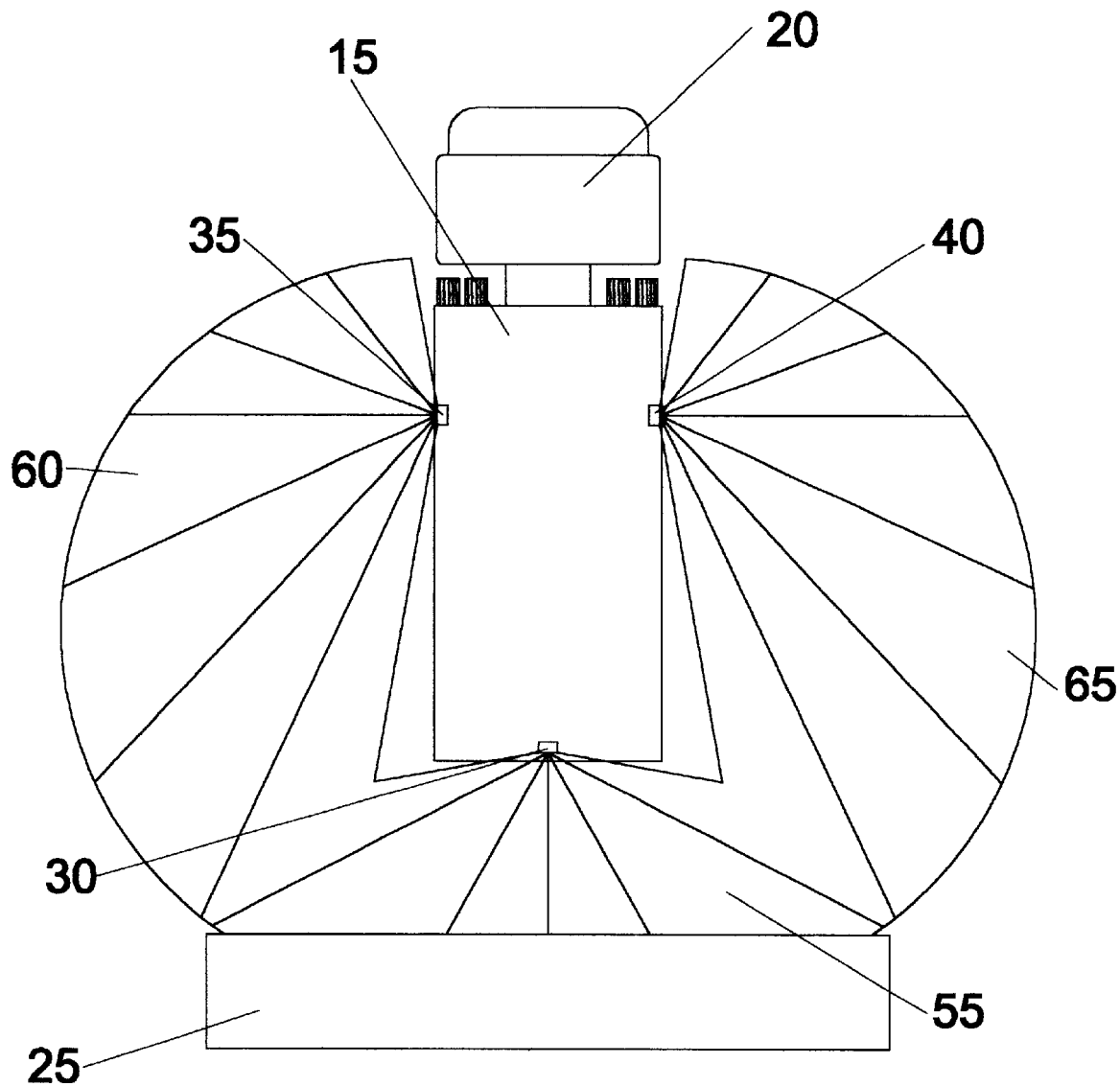
FIG. 2 is a top view, depicting the coverage patterns as utilized by the vehicle backup monitoring and alarm system.

Referring next to FIG. 2, a top view depicting the coverage patterns as utilized by the vehicle backup monitoring and alarm system 10 is shown. The rear detection module 30 produces a rear coverage pattern 55 that aids in navigation up to the loading dock 25. It should be noted that the rear coverage pattern 55 extends to both sides of the trailer 15 as well as to the rear. In a similar manner, the driver's side detection module 35 produces a drivers side coverage pattern 60 and the passenger side detection module 40 produces a passenger side coverage pattern 65. In a manner similar to that aforementioned with the rear coverage pattern 55, both the drivers side coverage pattern 60 and the passenger side coverage pattern 65 extend to the rear of the trailer 15. This overlapping coverage of the rear coverage pattern 55, the driver's side coverage pattern 60 and the passenger side coverage pattern 65 provides the driver located in the tractor 20, a 360-degree coverage pattern of the area surrounding the tractor 20 and the trailer 15. The remainder of the coverage around the tractor 20 is of course provided by the driver by looking through the windows of the tractor 20. The rear coverage pattern 55 will be particularly advantageous to the driver when backing up to loading dock 25 by aiding in distance determination as well as squareness to the loading dock 25. Many loading docks are also occupied with incoming utility services, waste collection systems, freight handling systems, employee or patron parking, and the like. The driver's side coverage pattern 60 and the passenger side coverage pattern 65 will be particularly advantageous to the driver in these instances where the confines or adjacent areas around loading docks are limited, and clearance on the sides is limited as well.

Figure 3:
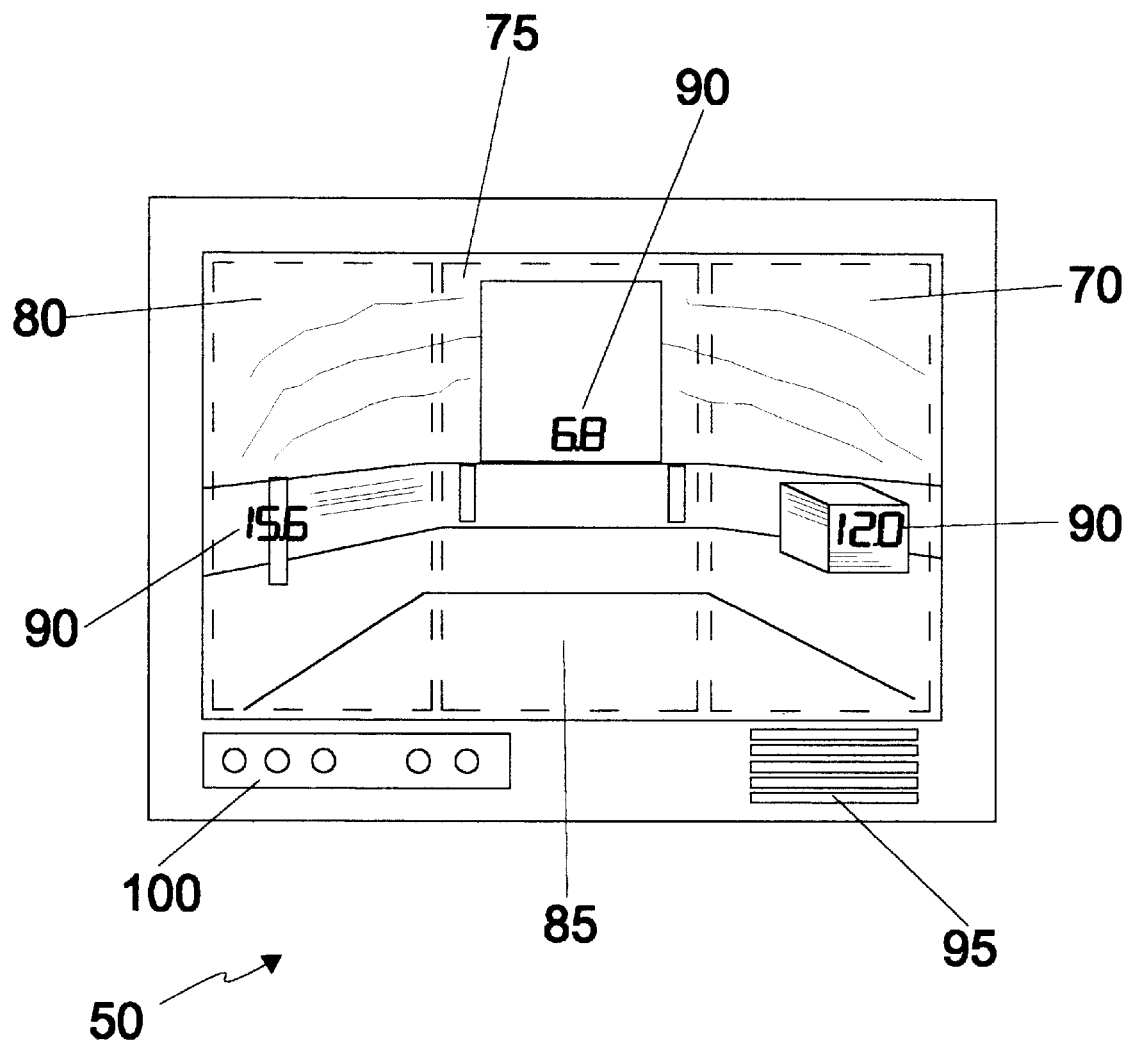
FIG. 3 is a pictorial view of the monitor as used with the present invention.

Referring now to FIG. 3, a pictorial view of the display monitor 50 is depicted. As aforementioned, the display monitor 50 is envisioned to be of a flat panel, color, LCD display, similar to that found on laptop computers, however, as can be seen by those familiar in the art that other methods including plasma displays, cathode ray tubes and the like may also be utilized and is not intended to be a limiting factor. The display area on the display monitor 50 comprises three separate areas. These areas are a driver's side display zone 70, a rear display zone 75, and a passenger side display zone 80, which represent the three associated images as provided by the driver's side detection module 35, the rear detection module 30 and the passenger side detection module 40 respectively. (As shown in FIG. 2). The dashed lines around each of the display zones are for descriptive purposes only and will not be visible to the driver. A pictorial image of a vehicle 85, in this case the trailer 15 (as shown in FIG. 1) is provided at the lower edge of the driver's side display zone 70, the rear display zone 75 and the passenger side display zone 80 for reference purposes. A series of distance display indicators 90, one for each of the display zones, are provided for each object that is the closest in each respective zone. In the instance of FIG. 3., a distance of 12 feet is indicated to a crate in the driver's side display zone 70, a distance of 6.8 feet is indicated to the loading dock itself in the rear display zone 75, and a distance of 15.6 feet is indicated to a bollard in the passenger side display zone 80. It should be noted that the distance display indicators 90 will reposition themselves over the closest object in their respective zone. In this manner, the driver is always aware of the closest item on each of the three sides, as well as the actual distance to it. The distance display indicators 90 themselves will change in value as the vehicle moves. If the distance to any object in any zone should fall below a minimum value, for purposes of illustration, say four feet, the respective distance display indicators 90 will begin to flash at a rapid rate and an alarm will sound via a speaker 95. In this manner the driver is afforded a warning to pay particular attention to that portion of the vehicle approaching the object. This warning feature with the audible alarm will continue even if the display monitor 50 is folded up and not in visual use by the driver (as described in FIG. 1). A control panel 100 for the purposes of adjusting brightness, contrast, and the like, as well as the predetermined minimum alarm distances is provided on the face of the display monitor 50 as well.

Figure 4:
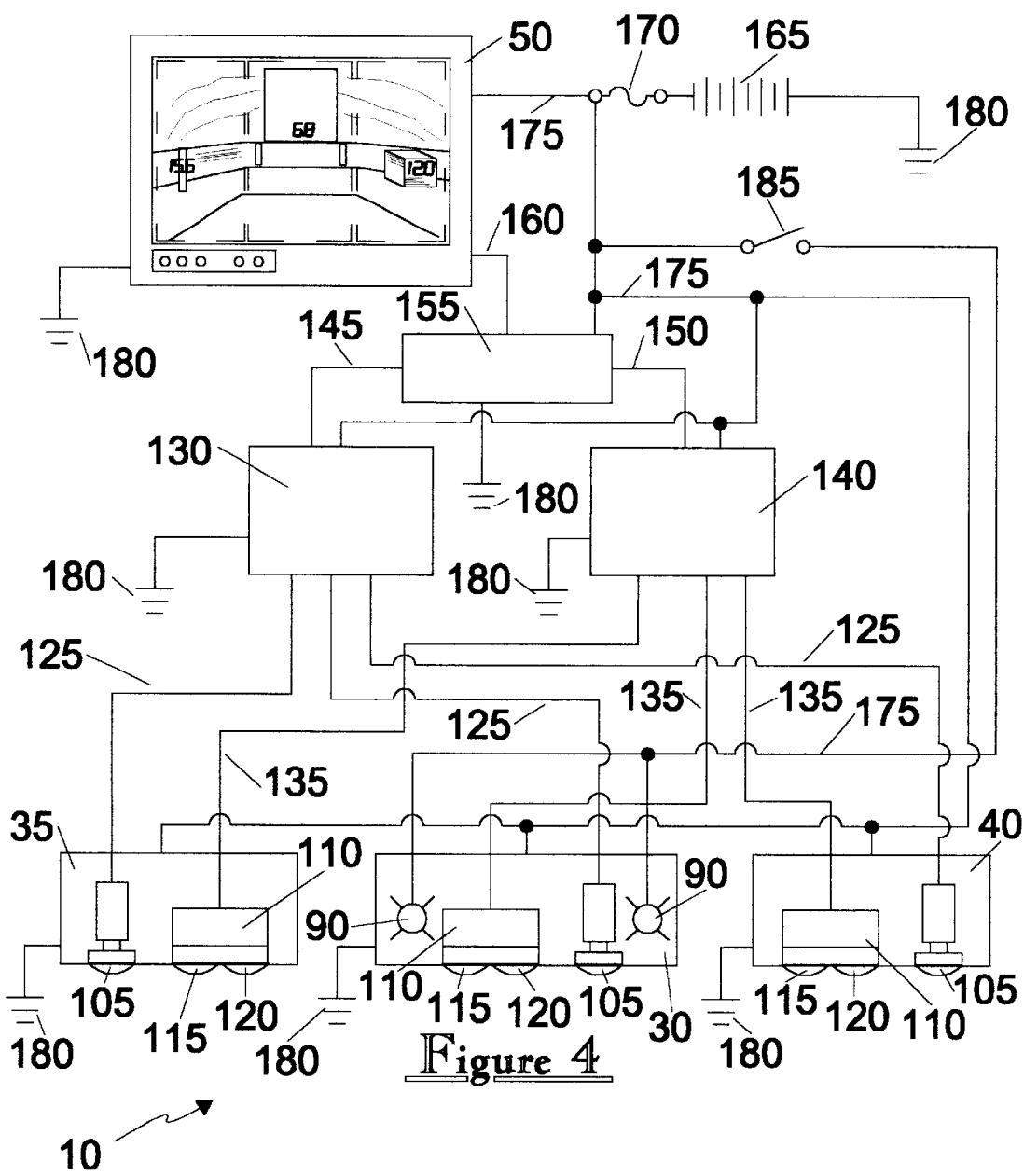
FIG. 4 is a functional electrical block diagram depicting the circuitry as used with the present invention.

Referring finally to FIG. 4, a functional electrical block diagram depicting the circuitry as used with the vehicle backup monitoring and alarm system 10 is disclosed. The rear detection module 30, the driver's side detection module 35, and the passenger side detection module 40 are each equipped with a video camera 105 and a laser-based distance detection device 110. Each laser-based distance detection device 110 in turn is supplied with an emitter 115 and a receiver 120. The laser-based distance detection device 110 functions in a commonly known manner by broadcasting a laser light through the emitter 115 and receiving the corresponding returns or reflections through the receiver 120. The signals from the video camera 105 are routed on a series of three video camera output cables 125 to a video mixer 130. At the video mixer 130 the corresponding video images are merged into one image that is eventually displayed on the display monitor 50. The signals from the laser-based distance detection device 110 are routed on a series of three distance detection output cables 135 to a distance conversion module 140. At the distance conversion module 140 the corresponding distance signals are interpreted and positioned via a series of x, y coordinates that is used later to display the actual distances on the display monitor 50. A composite video signal cable 145 from the video mixer 130 and a composite distance signal cable 150 from the distance conversion module 140 are routed to a final mixer 155, which generates an output signal on a composite signal cable 160 which is sent to the display monitor 50. Power for the above-mentioned components are provided from the electrical system of the invention equipped vehicle. Power is provided from an electrical supply means 165, such as a battery, through an over current protection device 170 such as a fuse to all of the components through a positive power supply bus 175. The negative supply is provided through a negative power supply bus 180, commonly known as the vehicle frame. For temporary installations, the positive power supply bus 175 and the negative power supply bus 180 would be provided through the cigarette lighter of the invention equipped vehicle to provide a means for ease of installation and removal of the vehicle backup monitoring and alarm system 10. A reverse switch 185 would provide electrical power to a pair of high intensity lamps 190 located in the rear detection module 30 to aid in vision when backing up under low light conditions. In such instances where the vehicle backup monitoring and alarm system 10 is permanently installed on a motor vehicle, the reverse switch 185 could be mechanically attached to the transmission linkage to allow for the automatic illumination of the high intensity lamps 190. In such instances where the vehicle backup monitoring and alarm system 10 is temporarily installed on a motor vehicle, the reverse switch 185 would be a manually actuated switch located in the interior cab near the driver where it would be actuated manually on an as needed basis. The video mixer 130, the distance conversion module 140 and the final mixer 155 would be located in the interior of the tractor 20 (as shown in FIG. 1) to aid in cooling and environmental protection. They would be provided in a separate enclosure or be provided as an integral part of the display monitor 50.

2. Operation of the Preferred Embodiment

In operation, the present invention can be easily utilized by the common user or driver of any motor vehicle or large truck in a simple and effortless manner. To use the present invention with its preferred embodiment can best be described in conjunction with the perspective views of FIG. 1, the top view of FIG. 2, the pictorial view of FIG. 3, and the functional electrical block diagram of FIG. 4.

To use the present invention, the user would first install the vehicle backup monitoring and alarm system 10 on the subject vehicle. The rear detection module 30 would be mounted on the rear of the vehicle, and the driver's side detection module 35 and the passenger side detection module 40 would be mounted on the two respective sides. All detection modules would be aimed and aligned to provide overlapping coverage as shown in FIG. 2. Next, the associated power and signal cables would be routed from the rear detection module 30, the driver's side detection module 35 and the passenger side detection module 40 to the video mixer 130, the distance conversion module 140 and the over current protection device 170 as shown in FIG. 4. Next the operation of all components would be verified in a stationary state, then brightness, contrast, and minimum distance determination would be made via the control panel 100 of the display monitor 50. At this point the vehicle backup monitoring and alarm system 10 is ready for operational duty.

While the driver is traveling on a road or highway, the vehicle backup monitoring and alarm system 10 provides protection by eliminating blind spots that are present in conventional side view mirrors. If the driver wishes to change lanes or turn a corner, a quick glance at the display monitor 50 will ensure that there are no other vehicles, persons or objects located on either side of his or her vehicle. If an object is there and within the predetermined minimum distance, the alarm will sound via the speaker 95 further alerting the driver to possible danger.

The vehicle backup monitoring and alarm system 10 also serves to aid the driver when backing into loading docks, unloading stations or other tight parking conditions. The driver may utilize the display monitor 50, consisting of the pictorial image as well as the superimposed distances to objects. In this manner the driver is afforded protection around the entire perimeter of his vehicle without the need to leave the vehicle to check distances or clearances or rely on a spotter or other individual. In the event of low light conditions that are not offset by the conventional backup lights on the vehicle, the driver may wish to utilize the high intensity lamps 190 as provided with the rear detection module 30.

While the above description is based upon a tractor trailer truck configuration, it is not intended to be a limiting factor. The vehicle backup monitoring and alarm system 10 can be used on any motor vehicle in an equally easy manner.

The foregoing description is included to illustrate the operation of the preferred embodiment and is not meant to limit the scope of the invention. The scope of the invention is to be limited only by the following claims.

COMPONENT LIST

| | | | |
|---|---|---|---|
| 10 | vehicle backup monitoring and alarm system | 100 | control panel |
| 15 | trailer | 105 | video camera |
| 20 | tractor | 110 | laser-based distance detection device |
| 25 | loading dock | 115 | emitter |
| 30 | rear detection module | 120 | receiver |
| 35 | driver's side detection module | 125 | video camera output cables |
| 40 | passenger side detection module | 130 | video mixer |
| | | 135 | distance detection output cables |
| 45 | interconnecting cables | 140 | distance conversion module |
| 50 | display monitor | 145 | composite video signal cable |
| 55 | rear coverage pattern | 150 | composite distance signal cable |
| 60 | drivers' side coverage pattern | 155 | final mixer |
| | | 160 | composite signal cable |
| 65 | passenger side coverage pattern | 165 | electrical supply means |
| 70 | driver's side display zone | 170 | over current protection device |
| 75 | rear display zone | | |
| 80 | passenger side display zone | 175 | positive power supply bus |
| 85 | pictorial image of vehicle | 180 | negative power supply bus |
| 90 | distance display indicators | 185 | reverse switch |
| 95 | speaker | 190 | high intensity lamps |

What is claimed is:

1. A vehicle backup monitoring and alarm system for assisting a trailer with its associated tractor in approaching a loading dock in a rearward or backing up fashion, said system comprising:

a rear detection module located on the rear of the trailer near the bottom, said rear detection module contains a small video camera, a laser-based distance detection module contains a small video camera, a laser-based distance detection system and a pair of high intensity lamps for increased rearward illumination over that normally provided by the reverse light provided on the trailer;

a driver's side detection module mounted on the trailer approximately one-third of the way back from the front near the bottom on the driver's side;

a passenger side detection module mounted in a manner symmetrical to the driver's side detection module on the passenger side of the trailer;

a series of interconnecting cables routed from the rear detection module, the driver's side detection module, and the passenger side detection module, under the trailer and up to the tractor, said interconnecting cables connecting a display monitor located near the head liner of the tractor in a position easily viewable by the driver;

said display monitor comprises a flat panel display mounted on a hinge and spring system, that is being folded up and away when not in use.

2. The vehicle backup monitoring and alarm system of claim 1, wherein both said driver's side detection module and said passenger side detection module are in electronic communication with said display.

3. The vehicle backup monitoring and alarm system of claim 2, wherein said display monitor comprises three separate areas including a driver's side display zone, a rear display zone, and a passenger side display zone, representing the three associated images as provided by the driver's side detection module, the rear detection module and the passenger side detection module.

4. The vehicle backup monitoring and alarm system of claim 3, further comprising a series of distance display indicators, one for each said display zones, for providing a distance indication for each object that is the closest in each respective zone.

5. The vehicle backup monitoring and alarm system of claim 4, wherein said rear detection module, said the driver's side detection module, and said passenger side detection module are each equipped with a video camera and a distance detection device.

6. The vehicle backup monitoring and alarm system of claim 5, wherein each said distance detection device comprises a laser-based distance detection device, said laser-based distance detection device supplied with an emitter and a receiver.

7. The vehicle backup monitoring and alarm system of claim 5, wherein the signals from the video camera are routed on a series of three video camera output cables to a video mixer, and wherein as said video mixer the corresponding video images are merged into one image that is eventually displayed on the display monitor.

8. The vehicle backup monitoring and alarm system of claim 7, wherein signals from the laser-based distance detection device are routed on a series of three distance detection output cables to a distance conversion module, and wherein at said distance conversion module corresponding distance signals are interpreted and positioned via a series of x, y coordinates that is used later to display the actual distances on the display monitor.

* * * * *